(12) United States Patent
Tsai et al.

(10) Patent No.: US 7,643,650 B2
(45) Date of Patent: Jan. 5, 2010

(54) SYSTEM AND METHOD FOR CALIBRATING A FEEDER FOR A SURFACE MOUNTING DEVICE

(75) Inventors: Tsung-Chih Tsai, Tu-Cheng (TW); Ming-Bin Wang, Shenzhen (CN); Hsuan-Jen Kung, Tu-Cheng (TW); Tao Peng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 594 days.

(21) Appl. No.: 11/309,576

(22) Filed: Aug. 25, 2006

(65) Prior Publication Data

US 2007/0097368 A1    May 3, 2007

(30) Foreign Application Priority Data

Oct. 28, 2005    (CN) .................. 2005 1 0100809

(51) Int. Cl.
  *G06K 9/00*    (2006.01)
  *H04N 9/47*    (2006.01)
  *G01G 13/02*   (2006.01)

(52) U.S. Cl. .................. 382/100; 382/141; 348/94; 177/116

(58) Field of Classification Search .......... 382/100, 382/141–154; 348/86, 94–95, 180; 177/116–122
See application file for complete search history.

(56) References Cited

U.S. PATENT DOCUMENTS

| 2,722,830 | A | * | 11/1955 | Federn et al. ............. 73/463 |
| 3,455,026 | A | * | 7/1969 | Brault ..................... 33/1 R |
| 4,418,773 | A | * | 12/1983 | Finet et al. ................ 177/16 |
| 4,876,728 | A | * | 10/1989 | Roth ...................... 382/153 |
| 5,195,234 | A | * | 3/1993 | Pine et al. ................. 29/720 |
| 5,537,204 | A | * | 7/1996 | Woodhouse ............ 356/243.1 |
| 5,742,173 | A | * | 4/1998 | Nakagomi et al. ......... 324/758 |
| 5,877,456 | A | | 3/1999 | Homer, III et al. |
| 6,259,960 | B1 | * | 7/2001 | Inokuchi .................. 700/110 |
| 6,904,164 | B2 | * | 6/2005 | Norioka et al. ............ 382/145 |
| 7,031,509 | B2 | * | 4/2006 | Narita et al. .............. 382/145 |

(Continued)

FOREIGN PATENT DOCUMENTS

TW    286857    9/1996

(Continued)

*Primary Examiner*—Manav Seth
(74) *Attorney, Agent, or Firm*—Wei Te Chung

(57) ABSTRACT

A method for calibrating a feeder for a surface mounting device (SMD) includes the steps of: reading a standard coordinate value; setting controlling parameters including a predefined amount of materials to be delivered and a predefined range of a coordinate deviation; booting the feeder (22) to deliver materials via an operation controller (20); capturing delivered material images of the materials and gear images of the feeder via an image controller (24); calculating coordinate deviations of the captured images; analyzing whether a total delivered amount of the materials is equal to the predefined amount; and calibrating the feeder according to the calculated coordinate deviations if the total delivered amount of the materials is equal to the predefined amount. A system for calibrating a feeder for a surface mounting device (SMD) is also disclosed.

9 Claims, 4 Drawing Sheets

U.S. PATENT DOCUMENTS

| | | | |
|---|---|---|---|
| 7,036,215 B2 * | 5/2006 | Kodama | 29/832 |
| 7,450,248 B2 * | 11/2008 | Fujieda et al. | 356/601 |
| 7,489,335 B2 * | 2/2009 | Kochi et al. | 348/180 |
| 2001/0053243 A1 * | 12/2001 | Norioka et al. | 382/145 |
| 2006/0170723 A1 * | 8/2006 | Thiessen et al. | 347/16 |
| 2007/0031024 A1 * | 2/2007 | Albeck et al. | 382/141 |
| 2007/0104353 A1 * | 5/2007 | Vogel | 382/106 |

FOREIGN PATENT DOCUMENTS

| | | |
|---|---|---|
| TW | 416006 | 12/2000 |
| TW | 595281 | 6/2004 |

* cited by examiner

SYSTEM AND METHOD FOR CALIBRATING A FEEDER FOR A SURFACE MOUNTING DEVICE

1. FIELD OF THE INVENTION

The present invention generally relates to systems and methods for calibrating a surface mounting technology (SMT) manufacturing equipment, and more particularly to a system and method for calibrating a feeder for a surface mounting device.

2. DESCRIPTION OF RELATED ART

Generally, mounting machines, such as a surface mounting device (SMD), as used in development and production, is needed to mount components on productions automatically and fleetly. With the development of electronic technology, electronic productions become more complex in configurations and require their components to be installed at a more precise position. That is, the mounting precision of a mounting machine is an important factor to a quality of electronic manufacturing. As a matter of fact, the material delivering precision of a feeder for the mounting machine is a major factor to the mounting precision of the mounting machine.

More recently, as a main method for calibrating a feeder for a surface mounting device, people magnify images of materials delivered by the feeder and images of gears of the feeder by manual operation, and analyze whether a material is delivered on a well position by observation with the eye. In this way, it is time consuming for a user to calibrate a feeder for the mounting machine, and it is worse especially for analyzing whether a material is delivered on a well position by observation that never ensure accuracy.

What is needed, therefore, is a system and method that calibrates a feeder for a surface mounting device, that can overcome the above-described problems, and so as to efficiently and accurately calibrate the feeder to deliver materials to the SMD.

SUMMARY OF THE INVENTION

A system for calibrating a feeder for a surface mounting device in accordance with a preferred embodiment includes an operation controller, an image controller, and a calibrating module. The operation controller is structured and arranged for controlling the operations on the feeder. The image controller is structured and arranged for capturing material images of materials delivered by the feeder and for capturing gear images of the feeder. The calibrating module is structured and arranged for calibrating the feeder via the operation controller and the image controller, and includes an input sub-module, a controlling sub-module, an analyzing sub-module, and a processing sub-module. The input sub-module is structured and arranged for reading a standard coordinate value, setting controlling parameters comprising a predefined amount of materials to be delivered and a predefined range of a coordinate deviation, for capturing the material images of materials delivered by the feeder, and for capturing the gear images of the feeder via the image controller. The controlling sub-module is structured and arranged for booting the feeder to deliver materials via the operation controller if a total delivered amount of the delivered materials is unequal to the predefined amount, and calibrating the feeder if a coordinate deviation of the captured images is beyond a predefined range. The analyzing sub-module is structured and arranged for analyzing whether a total delivered amount of the delivered materials is equal to the predefined amount, and for analyzing whether a coordinate deviation of the captured images is beyond the predefined range. The processing sub-module is structured and arranged for calculating the coordinate deviations of the captured images.

A method for calibrating a feeder for a surface mounting device in accordance with a preferred embodiment includes the steps of: reading a standard coordinate value; setting controlling parameters comprising a predefined amount of materials to be delivered and a predefined range of a coordinate deviation; booting the feeder to deliver materials via an operation controller; capturing delivered material images of the materials and gear images of the feeder via an image controller; calculating coordinate deviations of the captured images; analyzing whether a total delivered amount of the delivered materials is equal to the predefined amount; and calibrating the feeder according to the calculated coordinate deviations if the total delivered amount of the delivered materials is equal to the predefined amount.

Other advantages and novel features of the present invention will become more apparent from the following detailed description of preferred embodiments when taken in conjunction with the accompanying drawings.

DETAILED DESCRIPTION OF THE INVENTION

Figure 1:
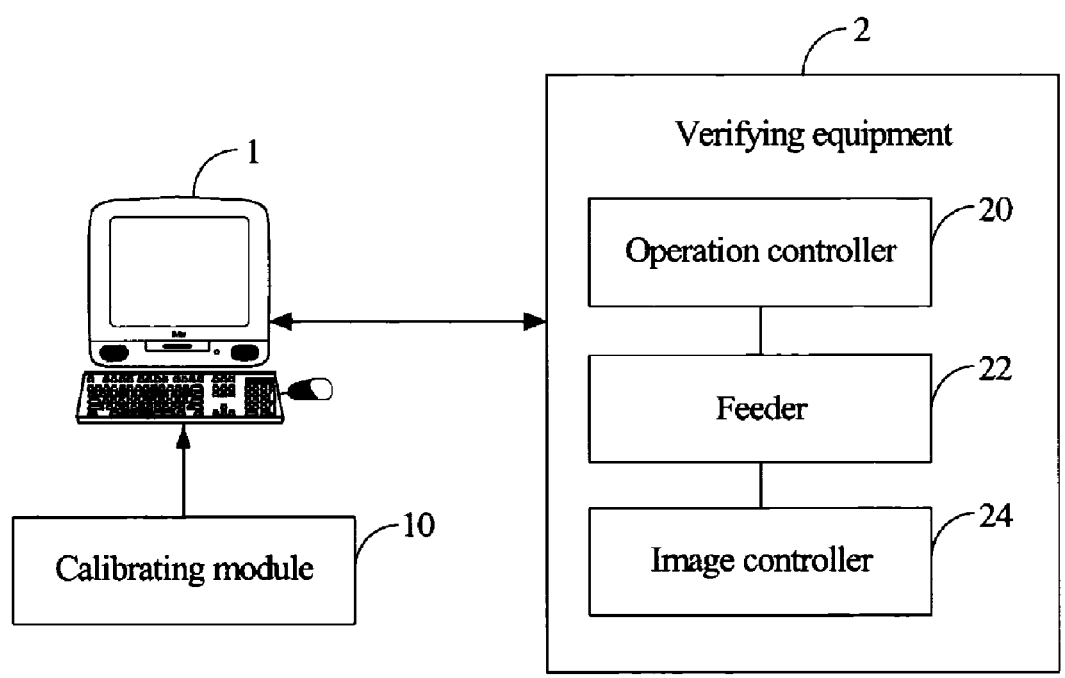
FIG. 1 is a schematic diagram of hardware configuration of a system for calibrating a feeder for a surface mounting device in accordance with a preferred embodiment.

FIG. 1 is a schematic diagram of a hardware configuration of a system for calibrating a feeder for a surface mount device (SMD) in accordance with a preferred embodiment. The system includes a computer 1 and a verifying equipment 2 connected with the computer 1. The computer 1 is connected to the verifying equipment 2 and includes a calibrating module 10. The verifying equipment 2 includes an operation controller 20, a feeder 22, and an image controller 24. The feeder 22 is connected with the operation controller 20 and the image controller 24. The operation controller 20 is structured and arranged for controlling operations on the feeder 22. The image controller 24 is structured and arranged for capturing delivered material images of materials delivered by the feeder 22 and gear images of the feeder 22.

Figure 2:
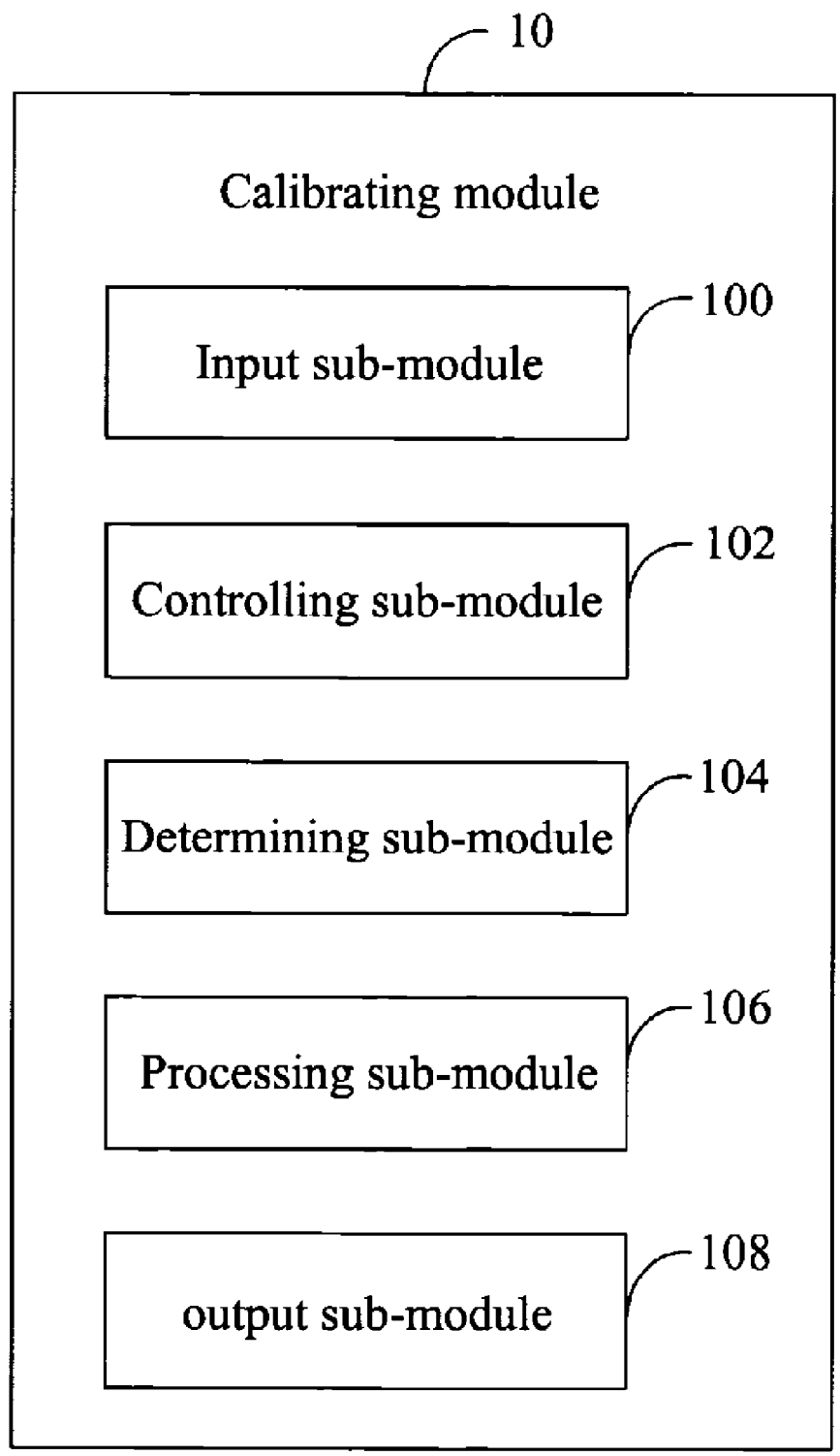
FIG. 2 is a schematic diagram of main function modules of a calibrating module of the system of FIG. 1.

FIG. 2 is a schematic diagram of main function modules of the calibrating module 10. The calibrating module 10 includes an input sub-module 100, a controlling sub-module 102, an analyzing sub-module 104, a processing sub-module 106, and an output sub-module 108.

The input sub-module 100 is structured and arranged for reading a standard coordinate value, capturing the delivered material images, and capturing the gear images of the feeder 22. The input sub-module 100 is further structured and arranged for prompting an input box—the user interface to set controlling parameters. In the preferred embodiment, the controlling parameters include delivery speed of materials, predefined amount of materials to be delivered, predefined allowable range of a coordinate deviation, and an identification number of the feeder 22. The standard coordinate value is a coordinate value of standard images that are captured by the image controller 24 on the verifying equipment 2.

The controlling sub-module 102 is structured and arranged for initializing the operation controller 20 and the image controller 24, for booting the feeder 22 to deliver materials, and for calibrating the feeder 22 according to coordinate deviations of the captured images.

The analyzing sub-module 104 is structured and arranged for prompting a first selection box with two options "Yes" and "No"—a user interface to record whether a standard coordinate value pre-stored by the computer 1 is to be used, and prompting a second selection box with two options "Yes" and "No"—the user interface to record whether stored controlling parameters pre-stored by the computer 1 are to be used. For example, the user selects the option "No" on the first selection box if the pre-stored standard coordinate values is not desired to be used. Otherwise, the user selects the option "Yes". Furthermore, the analyzing sub-module 104 is structured and arranged for analyzing whether the total delivered amount of materials is equal to the predefined amount, and for analyzing whether a coordinate deviation of a delivered material image or a gear image is beyond the predefined allowable range (for example, 0.05 mm).

The processing sub-module 106 is structured and arranged for calculating coordinate deviations of the captured images. The coordinate deviations are differences between the coordinate values of delivering points derived from the captured images and the standard coordinate value. The processing sub-module 106 is further structured and arranged for checking or deleting the calibrating data of the feeder 22. The coordinate deviations include an average coordinate deviation, a maximal coordinate deviation, and a minimal coordinate deviation. The calibrating data of the feeder 22 typically include the time of calibrating the feeder 22 and the identification number of the feeder 22.

The output sub-module 108 is structured and arranged for storing the standard coordinate value read by the input sub-module 100 and the controlling parameters set by the input sub-module 100, displaying the captured images, displaying bitmaps of the delivering points derived from the captured images dynamically, and storing the calculated coordinate deviations and the calibrating data of the feeder 22.

The analyzing sub-module 104 is further structured and arranged for prompting a third selection box with two options "Yes" and "No"—the user interface to record whether the calibrating data are to be checked.

Figure 3:
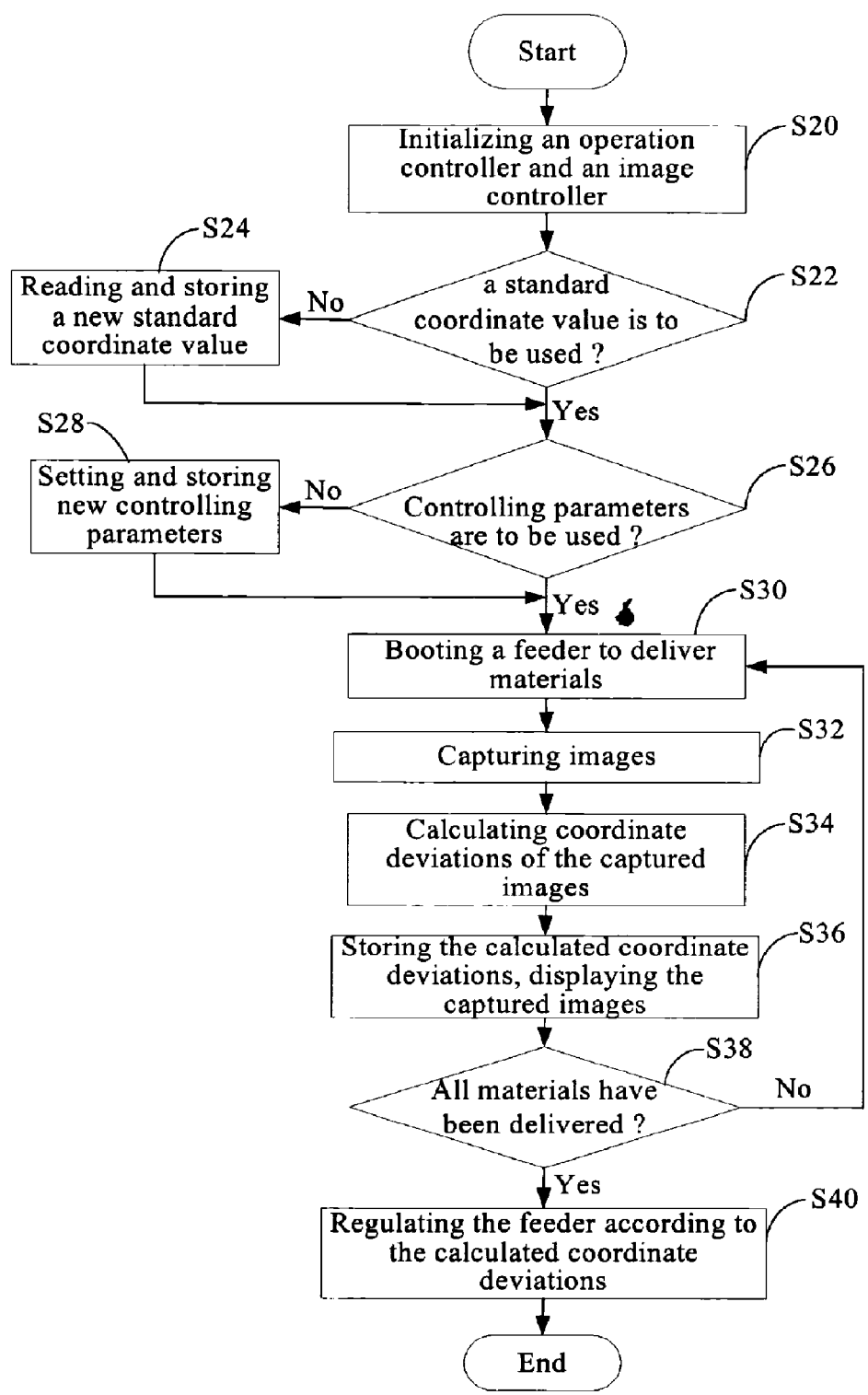
FIG. 3 is a flowchart of a method for calibrating a feeder for a surface mounting device in accordance with a preferred embodiment.

FIG. 3 is a flowchart of a method for calibrating a feeder for a surface mounting device (SMD) in accordance with a preferred embodiment. In step S20, the computer 1 is connected to the verifying equipment 2, and the calibrating module 10 initializes the operation controller 20, the feeder 22, and the image controller 24.

In step S22, the analyzing sub-module 104 prompts the first selection box with two options "Yes" and "No"—the user interface to record whether the standard coordinate value pre-stored by the computer 1 is to be used. If the pre-stored standard coordinate value is not desired to be used, in step S24, the input sub-module 100 reads a new standard coordinate value, and the output sub-module 108 stores the new standard coordinate value. Otherwise, if the pre-stored standard coordinate value is to be used, in step S26, the analyzing sub-module 104 prompts the second selection box with two options "Yes" and "No"—the user interface to record whether the controlling parameters pre-stored by the computer 1 are to be used. If the pre-stored controlling parameters are to be used, in step S30, the controlling sub-module 102 boots the feeder 22 to deliver materials via the operation controller 20. Otherwise, if the pre-stored controlling parameters are not desired to be used, in step S28, the input sub-module 104 prompts the input box—the user interface to set new controlling parameters, and the output sub-module 108 stores the new controlling parameters.

In step S32, the input sub-module 100 captures the delivered material images of materials delivered by the feeder 22 and gear images of the feeder 22 via the image controller 24. In step S34, the processing sub-module 106 calculates coordinate deviations of the captured images. In step S36, the output sub-module 108 stores the calculated coordinate deviations, and dynamically displays the captured image and bitmaps of the delivering points derived from the captured images.

In step S38, the analyzing sub-module 104 analyzes whether the total delivered amount of the materials is equal to the predefined amount. If the total delivered amount is equal to the predefined amount, in step S40, the calibrating module 10 calibrates the feeder 22 according to coordinate deviations of the captured images. Otherwise, if the total delivered amount is unequal to the predefined amount, the procedure returns directly to step S30 described above.

Figure 4:
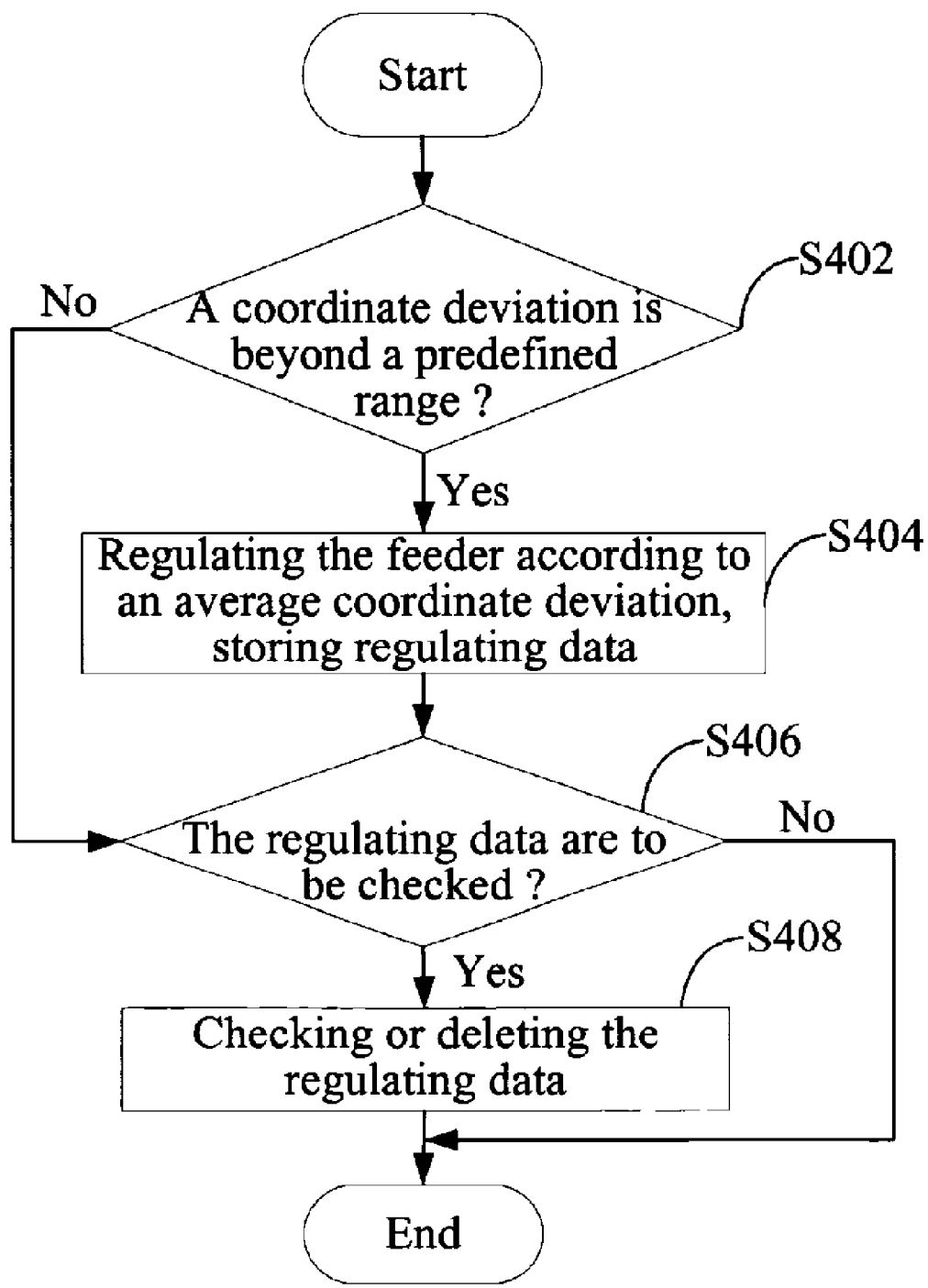
FIG. 4 is a flowchart of the step S40 of FIG. 3.

FIG. 4 is a flowchart of the step S40 described above. In step S400, the analyzing sub-module 104 analyzes whether a coordinate deviation of the captured images is beyond the predefined allowable range. If the coordinate deviation is beyond the predefined allowable range, in step S404, the controlling sub-module 102 calibrates the feeder 22 according to the average coordinate deviation, and the output sub-module 108 stores the calibrating data of the feeder 22. Otherwise, if the coordinate deviation is within the predefined allowable range, the procedure goes directly to step S406 described below. In step S406, the analyzing sub-module 104 prompts a third selection box with two options "Yes" and "No"—the user interface to record whether the stored calibrating data are to be checked. If the stored calibrating data are to be checked, in step S408, the processing sub-module 106 checks or deletes the stored calibrating data. Otherwise, if the calibrating data are not to be checked, the procedure ends.

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A system for calibrating a feeder for a surface mount device (SMD), the system comprising:

an operation controller structured and arranged for controlling the operations on the feeder;

an image controller structured and arranged for capturing material images of materials delivered by the feeder and for capturing gear images of the feeder; and a calibrating module structured and arranged for calibrating the feeder via the operation controller and the image controller, the calibrating module comprising:

an input sub-module structured and arranged for reading a standard coordinate value, setting controlling parameters comprising a predefined amount of materials to be delivered and a predefined range of a coordinate deviation, for capturing the material images of materials delivered by the feeder, and for capturing the gear images of the feeder via the image controller;

a controlling sub-module structured and arranged for booting the feeder to deliver materials via the operation controller if a total delivered amount of the delivered materials is unequal to the predefined amount, and calibrating the feeder if a coordinate deviation of the captured images is beyond a predefined range;

an analyzing sub-module structured and arranged for analyzing whether a total delivered amount of the delivered materials is equal to the predefined amount, and for analyzing whether a coordinate deviation of the captured images is beyond the predefined range; and a processing sub-module structured and arranged for calculating the coordinate deviations of the captured images.

2. The system as claimed in claim 1, wherein the feeder is connected with the operation controller and the image controller.

3. The system as claimed in claim 1, wherein the controlling parameters further comprise delivery speed of materials, and an identification number of the feeder.

4. The system as claimed in claim 1, wherein the coordinate deviations are differences between the coordinate values of delivering points derived from the captured images and the standard coordinate value.

5. The system as claimed in claim 1, wherein the calibrating module further comprises:

an output sub-module structured and arranged for storing the standard coordinate value and the controlling parameters, displaying the captured images, displaying bitmaps of the delivering points derived from the captured images dynamically, storing calibrating data of the feeder, and storing the calculated coordinate deviations.

6. A method for calibrating a feeder for a surface mount device (SMD), the method comprising the steps of:

reading a standard coordinate value;

setting controlling parameters comprising a predefined amount of materials to be delivered and a predefined range of a coordinate deviation;

booting the feeder to deliver materials via an operation controller;

capturing delivered material images of the materials and gear images of the feeder via an image controller;

calculating coordinate deviations of the captured images;

analyzing whether a total delivered amount of the delivered materials is equal to the predefined amount; and calibrating the feeder according to the calculated coordinate deviations if the total delivered amount of the delivered materials is equal to the predefined amount.

7. The method as claimed in claim 6, further comprising the steps of:

displaying the captured images; and displaying bitmaps of the delivering points derived from the captured images dynamically.

8. The method as claimed in claim 6, wherein the coordinate deviations are differences between the coordinate values of delivering points derived from the captured images and the standard coordinate value.

9. The method as claimed in claim 6, wherein the controlling parameters comprise delivery speed of materials, and an identification number of the feeder.

* * * * *

UNITED STATES PATENT AND TRADEMARK OFFICE
CERTIFICATE OF CORRECTION

| | | |
|---|---|---|
| PATENT NO. | : 7,643,650 B2 | Page 1 of 1 |
| APPLICATION NO. | : 11/309576 | |
| DATED | : January 5, 2010 | |
| INVENTOR(S) | : Tsai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 710 days.

Signed and Sealed this

Sixteenth Day of November, 2010

David J. Kappos
*Director of the United States Patent and Trademark Office*